April 25, 1950 — A. ZELEZNY — 2,505,454
REGULATION OF THE SUCTION ACTION CONTROL WITH TWO-STROKE ENGINES Filed July 17, 1947

INVENTOR
ANTONIN ZELEZNY

BY *Hazeltine Lake & Co.*

AGENTS

INVENTOR
ANTONIN ZELEZNY

Patented Apr. 25, 1950

2,505,454

UNITED STATES PATENT OFFICE 2,505,454

REGULATION OF THE SUCTION ACTION CONTROL WITH TWO-STROKE ENGINES

Antonín Železný, Velesin, Czechoslovakia

Application July 17, 1947, Serial No. 761,478
In Czechoslovakia June 12, 1946

Section 1, Public Law 690, August 8, 1946
Patent expires June 12, 1966

5 Claims. (Cl. 123—73)

1

With two-stroke engines, as is known, the suction action control has already been used for attaining a better filling and scavenging both of the crank housing as also of the cylinder by means of the suction air. This is attained by branching the suction conduits, the orifices of which must be opened as quickly as possible during the compression stroke of the cylinder and be again closed as quickly as possible during the working stroke of the piston. For this purpose, a highly complicated control has hitherto been used.

According to the invention, this device is extraordinarily simplified by a suitable union of the regulation of the suction action control with the drive of the injection pump, by means of a common single or double control cam. The invention is based on the knowledge or observation that there is a certain geometrical ratio between the most advantageous injection period and the duration of closing of a part or of the whole of the suction conduit orifices, which ratio is dependent above all upon the nature of the combustion in the engine in question. By means of this ratio, the regulation both of the suction action control as also of the injection pump, is made possible by means of a common control cam keyed on the crank shaft in the crank casing. This cam, according to the invention, only effects the closing of a part of the suction conduit orifices in the crank cases. The length of the cam ridge corresponds to the individual durations of closing or respectively to the position of the orifices. The fuel is injected into the cylinder by the injection pump with a definite angle of lead and the pump drive is shifted by an angle of lead with respect to the direction of rotation of the cam or of the crank shaft.

By means of this highly simple solution of the common control and injection pump drive, the best utilisation of the working space is attained with a complete filling and scavenging of the crank case and the cylinder, as also the most advantageous combustion of the fuel directly injected into the cylinder, whereby the fuel consumption of the engine is reduced to a minimum.

Figure 1:
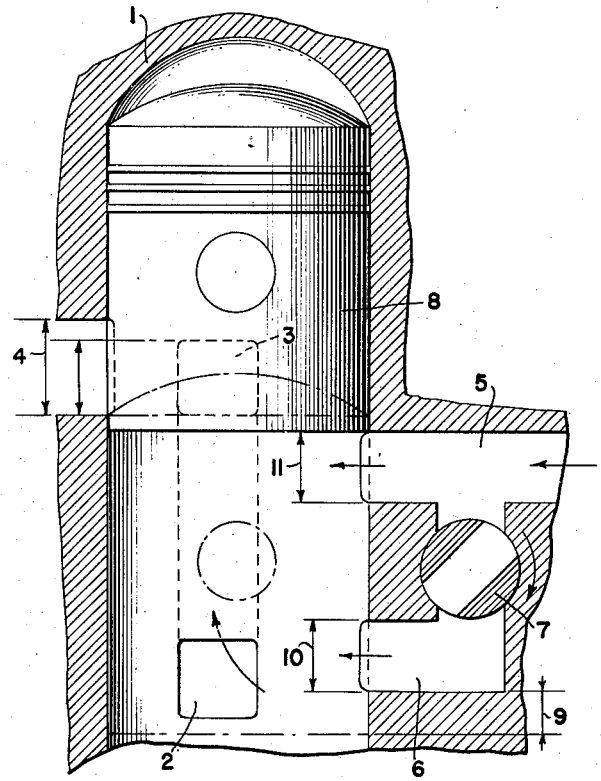
Figure 2:
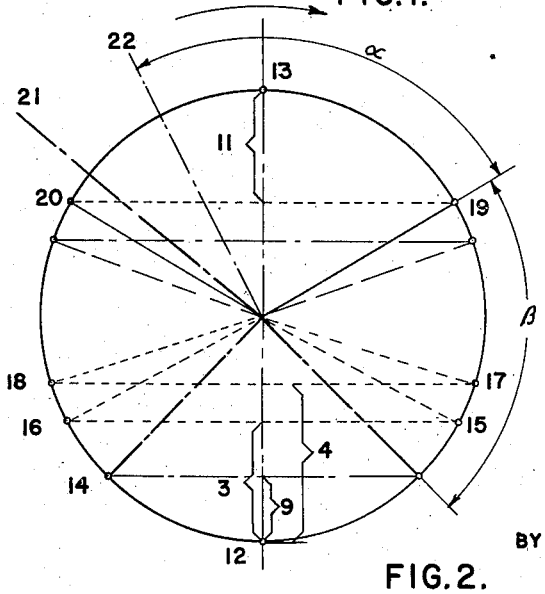
Figure 3:
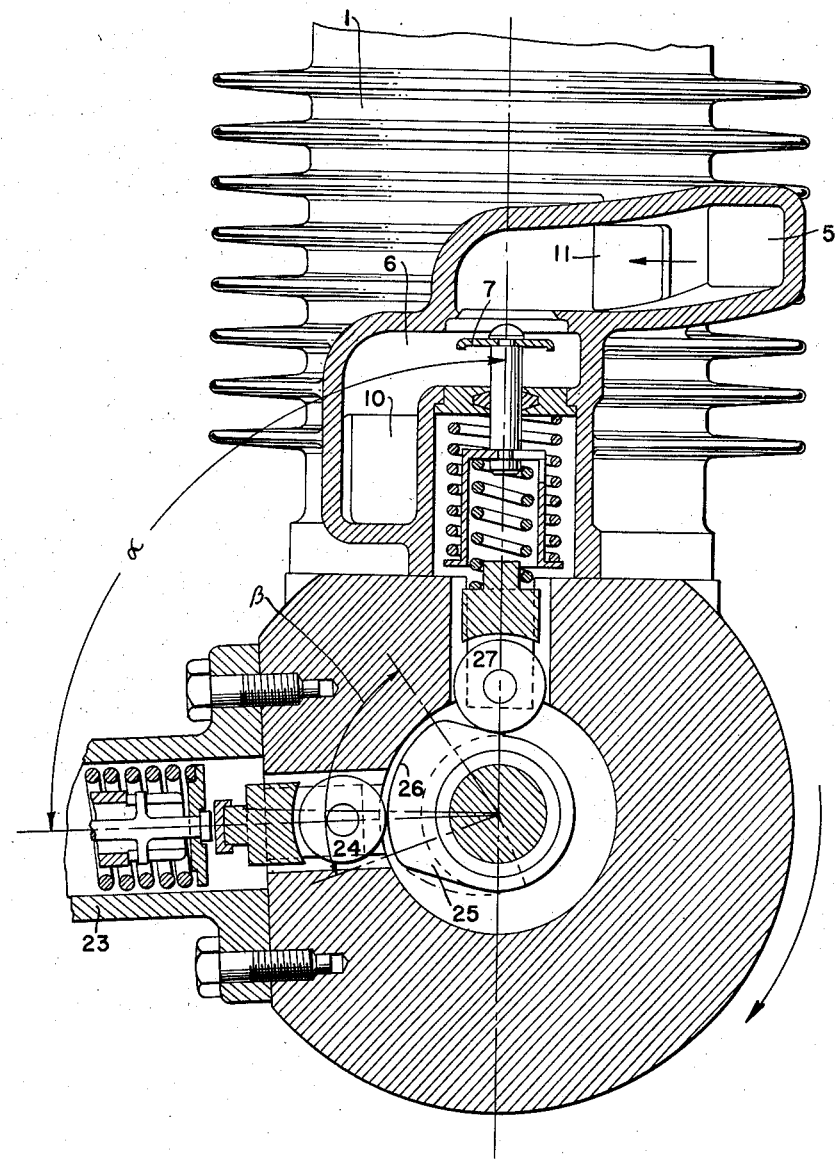

The invention is explained below with reference to the drawing by way of example in a practical embodiment, in which drawing Fig. 1 shows diagrammatically the cylinder with the corresponding control conduit, Fig. 2 is a diagram of the opening and closing of the conduits, and Fig. 3 presents a practical solution of a common drive of the suction action control and of the injection pump, in plan with partial section.

According to Fig. 1, the cylinder 1 with the by-pass conduit 2, 3 is provided, on the one hand,

2 with an exhaust port 4 and, on the other hand, with the suction conduit 5, in which latter there is arranged a branch 6 adapted to be closed by the valve 7. The corresponding piston 8 is shown in the upper dead point by full lines, and in the lower dead point by broken lines. At the commencement of the compression stroke, there is formed over the part of the stroke 9, that is, during the time the circulating air is driven out, a moderately reduced pressure under the piston, which directly afterwards, on the exposure of the port 10, produces in the suction conduit branch a preliminary entry through the valve 7 which is to be opened at the commencement of the piston stroke. Then, when the piston 8, just before the upper dead point, has uncovered the port 11 of the suction conduit 5, suction starts from this conduit and the branch 6 is closed by the valve 7. After compression has taken place, then on the working stroke of the piston 8, first the port 11 of the suction conduit 5 is closed, whilst the branch 6 is already closed, so that the piston on its further movement slightly compresses the suction air and at the end of the stroke the air is transferred through the conduit 2, 3 round the compression space, whereupon the whole working cycle is repeated.

In the diagram according to Fig. 2, there are shown between the two dead points of the piston, the times of opening and closing of the individual conduits and the angle of adjustment of the injection pump and valve operation. On the vertical diameter of the lower dead point 12 to the upper dead point 13 are shown the finishing course 9, the transfer course 3, the level or height of the exhaust port 4 and of the suction port 11. There are then shown on the circumference of the diagram, the leading suction commencement 14, the beginning of the opening 15, and the commencement of the closing 16 in the case of the by-pass and, furthermore, the opening 17 and closing 18 of the exhaust, the closing 19 and opening 20 of the suction conduit, the commencement 21 and the conclusion 22 of the injection, alpha indicates the angle of shift or adjustment of the same with respect to the suction control drive and beta the length of ridge or lift of the common drive cam, in angular measurement. From this diagram it can be seen that a shifting to these two drives of about 90° is constructively possible.

In Fig. 3 is shown an embodiment of a practical solution according to the invention. The cylinder is provided with a suction conduit 5 opening into the port 11, which conduit has a branch 6 which opens into the port 10 in the cylinder and is closed or opened by a valve 7 actuated by the roller 27. The injection pump 23 shifted by about 90° with respect to the direction of rotation of the crank shaft but otherwise arranged approximately in the same plane as the drive of the suction control is actuated by a roller 24 bearing on the common cam disc 25, which is keyed on the crank shaft and the length of the ridge or lift 26 of which corresponds to the operation of the valve 7, since the roller 27 thereof bears on this cam disc though at a different angle.

I claim:

1. In a two stroke internal combustion engine of the type including a cylinder, a piston in said cylinder, a crankshaft driven by said piston, an exhaust port in the combustion chamber of said cylinder and positioned to be uncovered near the bottom of the piston stroke, a bypass conduit communicating between a port in the lower end of said cylinder to be covered by the piston at the bottom of its stroke and a port in the combustion chamber of the cylinder to be uncovered by the piston at the bottom of its stroke, and injector means operable to inject fuel into the combustion chamber, the improvement comprising a suction conduit communicating with the lower end of said cylinder through a port positioned to be uncovered at the top of the piston stroke, said suction conduit further including a branch conduit communicating with the lower end of said cylinder through a port positioned to be covered at the bottom of the piston stroke, a valve in said branch conduit and operable between open and closed positions, and means connected to operate both said valve and said injector from said crankshaft in predetermined timed relation to the movement of said piston.

2. In a two stroke internal combustion engine of the type including a cylinder, a piston in said cylinder, a crankshaft driven by said piston, an exhaust port in the combustion chamber of said cylinder and positioned to be uncovered near the bottom of the piston stroke, a bypass conduit communicating between a port in the lower end of said cylinder to be covered by the piston at the bottom of its stroke and a port in the combustion chamber of the cylinder to be uncovered by the piston at the bottom of its stroke, and injector means operable to inject fuel into the combustion chamber, the improvement comprising a suction conduit communicating with the lower end of said cylinder through a port positioned to be uncovered at the top of the piston stroke, said suction conduit further including a branch conduit communicating with the lower end of said cylinder through a port positioned to be covered at the bottom of the piston stroke, a valve in said branch conduit and operable between open and closed positions, and means including a single cam connected to operate both said valve and said injector from said crankshaft in predetermined timed relation to the movement of said piston.

3. In a two stroke internal combustion engine of the type including a cylinder, a piston in said cylinder, a crankshaft driven by said piston, an exhaust port in the combustion chamber of said cylinder and positioned to be uncovered near the bottom of the piston stroke, a bypass conduit communicating between a port in the lower end of said cylinder to be covered by the piston at the bottom of its stroke and a port in the combustion chamber of the cylinder to be uncovered by the piston at the bottom of its stroke, and injector means operable to inject fuel into the combustion chamber, the improvement comprising a suction conduit communicating with the lower end of said cylinder through a port positioned to be uncovered at the top of the piston stroke, said suction conduit further including a branch conduit communicating with the lower end of said cylinder through a port positioned to be covered at the bottom of the piston stroke, a valve in said branch conduit and operable between open and closed positions, and means connected to operate both said valve and said injector from said crankshaft in predetermined timed relation to the movement of said piston, the timed relation being such that said valve is opened at the bottom of the piston stroke and closed at the top of the piston stroke.

4. In a two stroke internal combustion engine of the type including a cylinder, a piston in said cylinder, a crankshaft driven by said piston, an exhaust port in the combustion chamber of said cylinder and positioned to be uncovered near the bottom of the piston stroke, a bypass conduit communicating between a port in the lower end of said cylinder to be covered by the piston at the bottom of its stroke and a port in the combustion chamber of the cylinder to be uncovered by the piston at the bottom of its stroke, and injector means operable to inject fuel into the combustion chamber, the improvement comprising a suction conduit communicating with the lower end of said cylinder through a port positioned to be uncovered at the top of the piston stroke, said suction conduit further including a branch conduit communicating with the lower end of said cylinder through a port positioned to be covered at the bottom of the piston stroke, a valve in said branch conduit and operable between open and closed positions, and means including a single cam connected to operate both said valve and said injector from said crankshaft in predetermined timed relation to the movement of said piston, the connection to operate said injector by said cam being in the same plane and shifted angularly from the connection to operate said valve by said cam.

5. In a two stroke internal combustion engine of the type including a cylinder, a piston in said cylinder, a crankshaft driven by said piston, an exhaust port in the combustion chamber of said cylinder and positioned to be uncovered near the bottom of the piston stroke, a bypass conduit communicating between a port in the lower end of said cylinder to be covered by the piston at the bottom of its stroke and a port in the combustion chamber of the cylinder to be uncovered by the piston at the bottom of its stroke, and injector means operable to inject fuel into the combustion chamber, the improvement comprising a suction conduit communicating with the lower end of said cylinder through a port positioned to be uncovered at the top of the piston stroke, said suction conduit further including a branch conduit communicating with the lower end of said cylinder through a port positioned to be covered at the bottom of the piston stroke, a valve in said branch conduit and operable between open and closed positions, and means including a single cam connected to operate both said valve and said injector from said crankshaft in predetermined timed relation to the movement of said piston, the connection to operate said injector by said cam being in the same plane and shifted 90° angularly from the connection to operate said valve by said cam.

ANTONÍN ŽELEZNÝ.

(References on following page)

REFERENCES CITED

The following references are of record in the file of this patent:

UNITED STATES PATENTS

| Number | Name | Date |
|---|---|---|
| 583,628 | Nash | June 1, 1897 |
| 891,366 | Pierce | June 23, 1908 |
| 980,134 | Springer | Dec. 27, 1910 |
| 1,183,688 | Snyder | May 16, 1916 |
| 1,201,532 | Thomas | Oct. 17, 1916 |
| 2,012,998 | Junkers | Sept. 3, 1935 |

FOREIGN PATENTS

| Number | Country | Date |
|---|---|---|
| 157,918 | Great Britain | of 1922 |